(12) United States Patent
Berger et al.

(10) Patent No.: US 6,203,895 B1
(45) Date of Patent: Mar. 20, 2001

(54) WEAR RESISTING PARTS FOR PROCESS VALVES

(75) Inventors: Lutz-Michael Berger, Dresden (DE); Kai Laitinen, Helsinki (FI); Petri Vuoristo, Tampere (FI); Tapio Mäntylä, Tampere (FI)

(73) Assignee: Neles Controls Oy, Helsinki (FI)

( * ) Notice: Subject to any disclaimer, the term of this patent is extended or adjusted under 35 U.S.C. 154(b) by 0 days.

(21) Appl. No.: 09/269,786

(22) PCT Filed: Sep. 25, 1997

(86) PCT No.: PCT/DE97/02206

§ 371 Date: Apr. 1, 1999

§ 102(e) Date: Apr. 1, 1999

(87) PCT Pub. No.: WO98/14629

PCT Pub. Date: Apr. 9, 1998

(30) Foreign Application Priority Data

Oct. 2, 1996 (DE) .............................. 196 40 787

(51) Int. Cl.$^7$ ..................................... B32B 18/00
(52) U.S. Cl. .......................... 428/325; 428/457; 428/698; 384/907.1; 384/913
(58) Field of Search .................. 428/325, 323, 428/403, 551, 457, 698; 384/907.1, 910, 912, 913

(56) References Cited

U.S. PATENT DOCUMENTS

| | | |
|---|---|---|
| 3,859,057 | 1/1975 | Stoll et al. . |
| 4,806,394 | 2/1989 | Steine . |

FOREIGN PATENT DOCUMENTS

| | | |
|---|---|---|
| 1174997 | 7/1964 | (DE) . |
| 224 057 | 6/1985 | (DE) . |
| 224057 | 6/1985 | (DE) . |
| 41 34 144 | 6/1993 | (DE) . |
| 4134144 | 6/1993 | (DE) . |
| 42 29 006 | 3/1994 | (DE) . |
| 1433399 | 4/1976 | (GB) . |

OTHER PUBLICATIONS

Johner et al: Verschleissschutz Durch Thermisches Spritzen Wolframkarbidhaltiger Metallschichten: vol. 44, No. 9, Sep. 1990 pp. 451–454 XP000176368.

P. Vuoristo et al: "Properties of TIC–N1 and (Ti, Mo)C–NiCo coatings sprayed from agglomerated and sintered powders" Thermal Spraying Conference, International DVS–Conference, Mar. 6–8, 1996, Essen, pp. 58–61, XP002056407.

S. Economou et al: "Tribological behavior of TiC/TaC–reinforced cermet plasma sprayed coatings tested against sapphire" Wear, vol. 185, 1995, pp. 93–110, XP002056408 (no month).

Primary Examiner—Timothy M. Speer
Assistant Examiner—Bryant Young
(74) Attorney, Agent, or Firm—Pillsbury & Winthrop

(57) ABSTRACT

The invention relates to wear resistant parts for process valves. The use of said parts can be particularly advantageous in the chemical and petrochemical industry, in the mining industry and in other processing industries. According to the invention, the wear resistant parts for process valves are characterized by a 50 to 500 μm thick coating applied by thermal spraying on the valve surfaces subjected to wear, particularly on the bearing and sealing faces. The coating is characterized by the fact that one or more cubic hard material phases containing Ti and/or Ti and a second metal and a metal binder phase can be demonstrated therein, and by the fact that when the coatings are rubbed against each other within a temperature range of from room temperature to 600° C., the friction coefficient is <0.6.

8 Claims, 2 Drawing Sheets

WEAR RESISTING PARTS FOR PROCESS VALVES

This application is the national phase of international application PCT/DE97/02206 filed Sep. 25, 1997, which designated the U.S.

BACKGROUND OF THE INVENTION

The invention relates to parts for process valves, provided with a thermally sprayed coating to protect them from wear. The process valves are components of larger technical apparatuses used in the chemical and petrochemical industry, in the mining industry and in other processing industries.

The invention is thus particularly advantageous when used in these fields.

It is important that the process valves do not have any or have extremely few leakages, and that no deposits occur under any operating conditions between the waiting intervals. This requires good adhesive wear resistance from the sealing faces of the valves.

The valve surfaces in contact with the process media (e.g. liquids, sludge and solids) are generally exposed to aggressive, particularly corrosive effects of the media. The high rate of the process media also causes erosive and/or abrasive wear. Further, a prerequisite for the control and reliability of all adjusting motions is that the sealing faces of the valves, which rub against each other, must have a low friction coefficient.

Coating is an effective way of achieving the required low friction coefficients on the surfaces of the parts for process valve and simultaneously reliably protecting the surfaces from wear and corrosion. Different coating techniques, such as hard chrome plating, non-conductive nickel plating, coating with stellite using powder plasma dot welding, thermal spraying and sintering of free-flowing alloys, such as NiCrBSi, are used to protect the surfaces of the valve parts. Thin electrolytically or non-conductively applied coatings tend to wear under heavy load (e.g. high pressure exerted on the surface) and have an operating temperature not higher than 400° C. In the powder plasma dot welding and the sintering of the free-flowing alloys, the process valve parts, subjected to high thermal load during the coating process, tend to distort. Further, the sintering of the coatings in the furnace is time consuming and expensive.

The thermal spraying methods, such as plasma spraying, detonation spraying and high-rate flame spraying (HVOF), are the most effective methods of applying thick and wear resistant coatings that are able to resist high surface pressure even at high temperatures and at the same time, exhibit good wear resistance. Different thermally sprayed coating systems are used to coat process valve parts. Such coatings are used in particular on the bearing and sealing faces of the valves. The function of the coatings is to reduce adhesive wear, generally together with abrasive wear, and to reduce the friction coefficients of the surfaces rubbed against each other. In addition, high moist corrosion and temperature stability are simultaneously required in many cases.

DESCRIPTION OF RELATED ART

DE OS 42 29 006 teaches the use of universal metal carbide in a metal matrix as a thermally sprayed coating to protect a pair of components subjected to friction, but the solution of the publication is, however, restricted to WC—Co.

The prior art relating to the use of thermally sprayed coatings in process valves is described in detail in two publications (1. R. Manuel, E. Yung, Proc. 7$^{th}$ National Thermal Spray Conference 1994, Boston, ASM International, p. 111–114; and 2. E. J. Barrette, Proc. 8$^{th}$ National Thermal Spray Conference 1995, Houston, ASM International, p. 699–704). In particular, the publications describe the use of commercially available standard cemented carbide systems as coating systems to coat process valve parts. These include in particular WC—Co and WC—Ni, usually alloyed with Cr, and $Cr_3C_2$—NiCr coatings.

When the above coating systems are used in the above way, their typical defects are apparent. The use of WC—Co is restricted by its poor corrosion resistance and low operating temperature. The alternative Ni binder phases or the alloying with chrome can solve the problems only in part. $Cr_3C_2$NiCr has essentially better corrosion resistance, but poorer wear resistance.

The friction coefficient of all these coating systems is acceptable at low operating temperatures, but within the temperature range 200 to 600° C. the coefficients are too high.

The systems also have a restricted alloying capacity, and so the alloy compositions for the coatings can be adapted to a particular use only to a very restricted extent.

Another alternative is to use TiC as hard material with a suitable binder matrix, as described in U.S. Pat. No. 4,233,072 and WO 87/04732 A1. However, the use of TiC as the only hard material phase and, moreover, in a lower concentration does not suffice to improve the coating characteristics over the prior art cited above. Further, the use of the coating powders described in DD OS 224 057 and DE OS 4 134 144 does not solve the problem, either, since the pulverized raw material in these two publications does not show any particular hard material structures that would enable the production of thermally sprayed coatings with improved characteristics.

SUMMARY OF THE INVENTION

It is therefore an object of the present invention to provide parts of the above type for process valves, the parts being better suited to extreme operating conditions than the prior art solutions are and are also cost-effective and simple to manufacture.

It is another object of the invention to provide a coating system for parts that is easily adaptable to different operating conditions by changing the alloy like composition.

It is yet another object of the invention to provide a coating system for parts that ensures a low friction coefficient and high wear and corrosion resistance.

It is thus the object of the present invention to provide a cost-effective wear resistant coating for process valves, the coating having a low friction coefficient and being adaptable to the operating requirements of the process valves by the change of the alloy composition and having high wear resistance.

DESCRIPTION OF THE PREFERRED EMBODIMENTS

Figure 1:
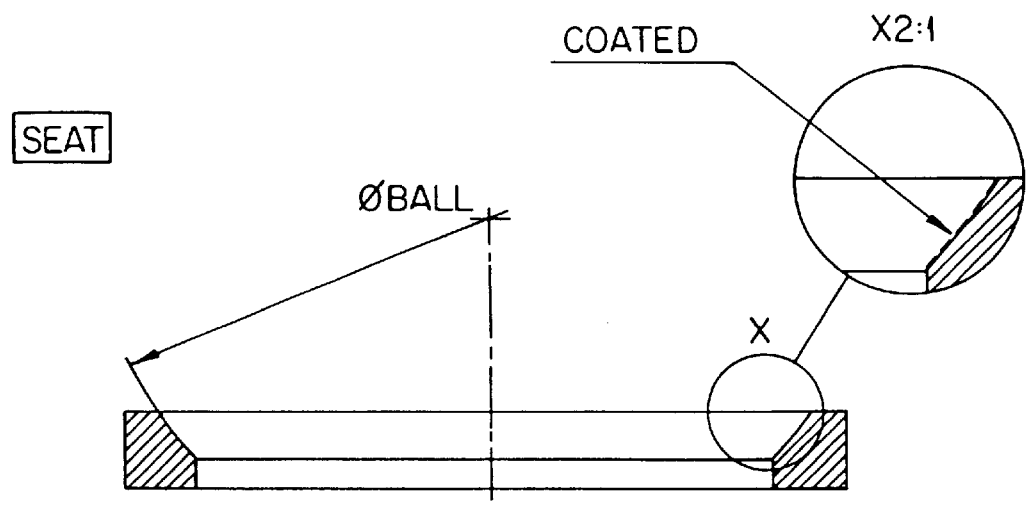
FIG. 1 is a schematic view of a ball valve surface to be coated.
Figure 1:
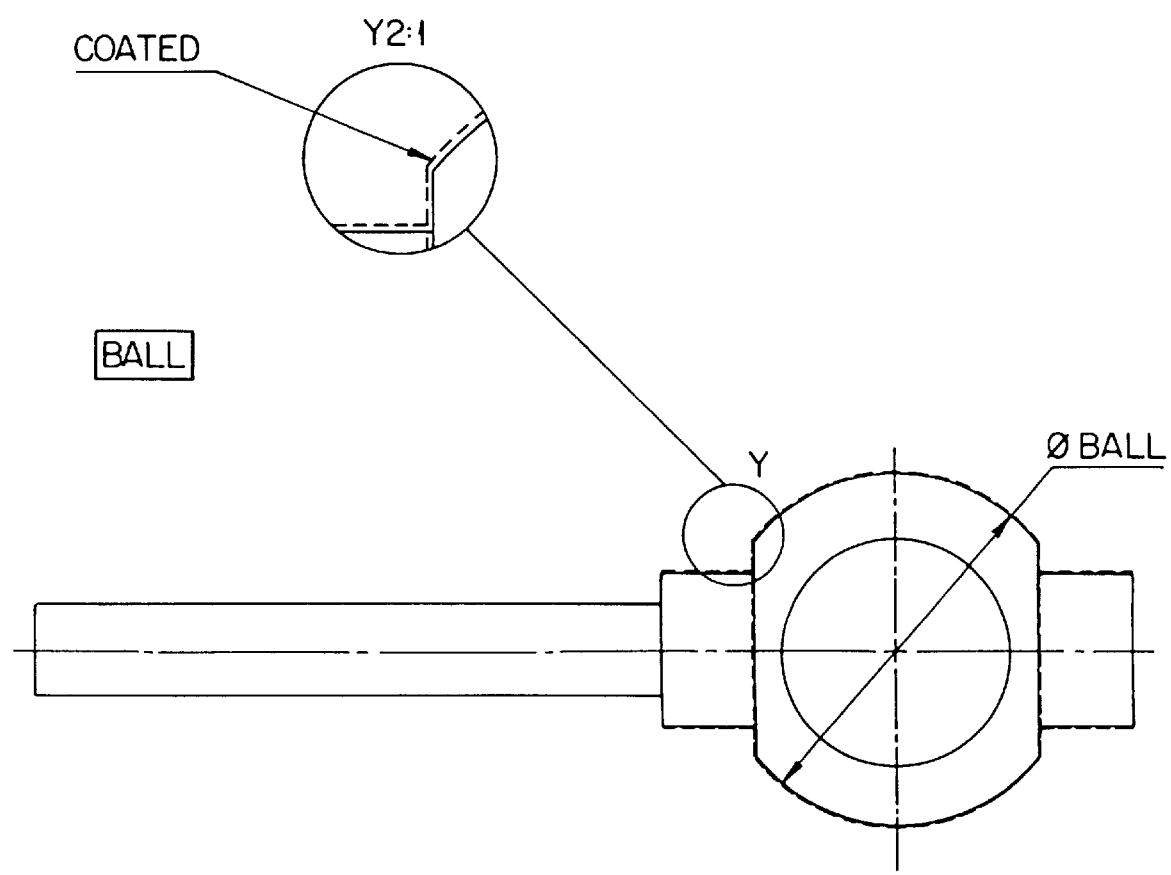

The wear resistant parts for process valves according to the invention are characterized in that a 50 to 500 $\mu m$, preferably 100 to 300 μm thick coating is applied on the surfaces of the valves subjected to wear, particularly on the bearing and sealing faces, by a thermal spraying method. By way of example, FIG. 1 shows a ball valve whose surfaces are to be coated. The coating is characterized in that a plural number of cubic hard material phases containing Ti and C, and/or Ti, a second metal and carbon, and a metal binder phase can be demonstrated therein. The demonstration can be carried out using various physical testing methods, such as X-ray diffraction analysis, raster electron microscopic tests and energy dispersion X-ray analysis (EDX) of metallographic preparations of sprayed samples, as well as using other methods wherein the coating powder having the cemented carbide like microstructure is made from either the hard phase or the binder phase or both and at least one of the elements Zr, Hf, V, Nb, Ta and Cr. The coating system of the invention can be optimally adapted to the operating conditions of the process valve by simple alloying-technical operations.

Figure 2:
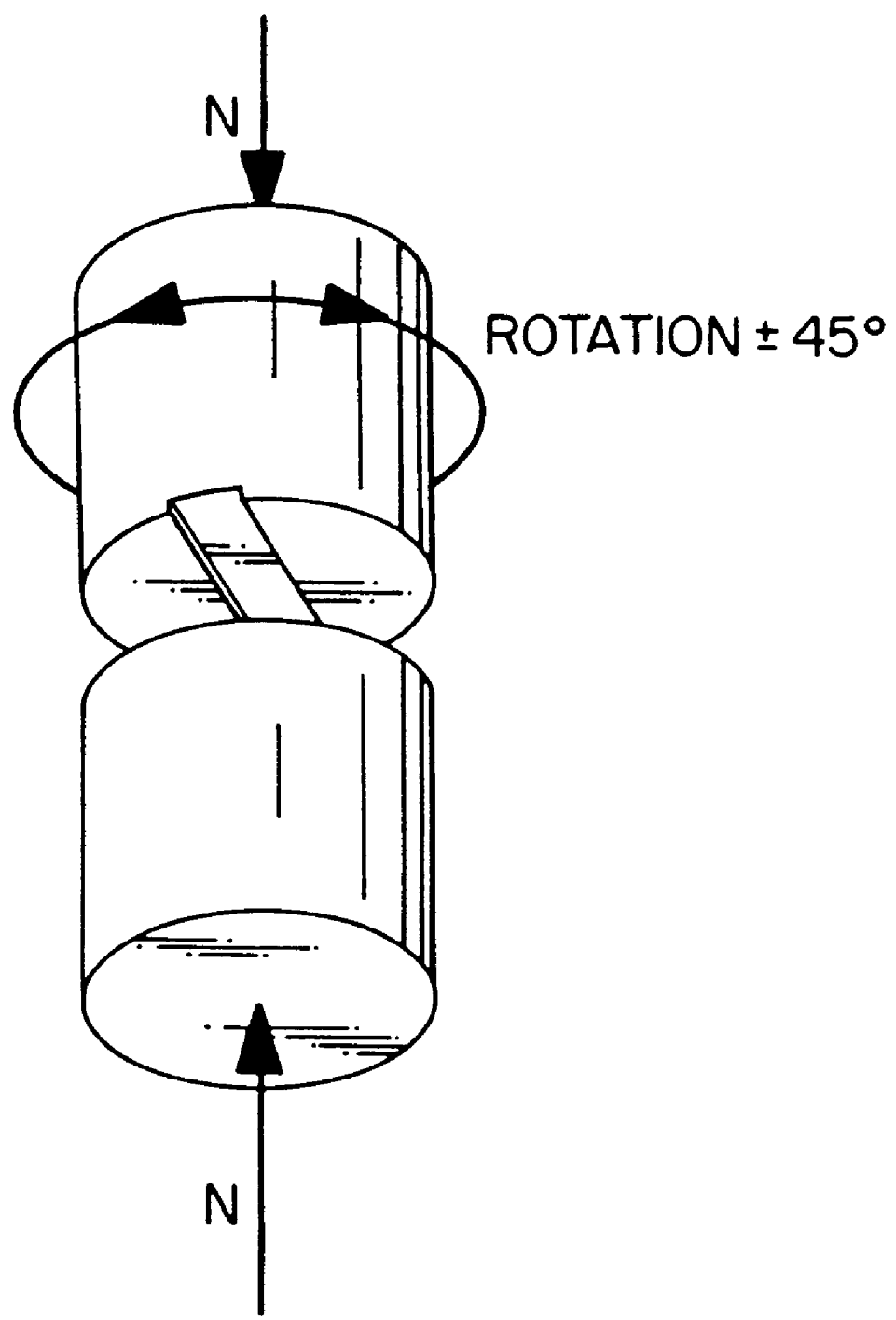
FIG. 2 is a schematic view of a cylinder wear test principle.

When the coatings provided by the invention are rubbed against each other as presented generally in the cylinder wear test illustrated in FIG. 2, their friction coefficient within the temperature range of from room temperature to 600° C. is <0.6. This particularly applies to the temperature range of from 200 to 600° C. The test can be used to assess the usefulness of the coatings in process valves. The coating system developed differs from the prior art in that it has a lower friction coefficient than conventional cemented carbide like systems, and that it endures high pressure on the surface and is simultaneously resistant to wear and corrosion.

According to the invention, on process valve parts, particularly on the bearing and sealing faces, a coating made from a coating powder by a method, such as plasma spraying, high-rate flame spraying and detonation spraying. The nucleus/shell structure of the hard material phase characteristic of the coating powder transfers to the coating and can be demonstrated therein.

A particular advantage in the use of the coating system is that molybdenum, which reduces the friction coefficient of the coatings, is compatible with the other basic components of the coating system. Molybdenum can be bonded both to the hard material phase and to the binder phase. In a nitrogen-free system, the carbon content is decisive in this respect. In a nitrogen-containing system, the distribution of Mo in the hard material phases and in the binder is regulated by the nitrogen. The compatibility of molybdenum with the other components and the possibility of regulating the Mo content in the hard material phases and the binder phase also makes it possible to restrict the amount of this expensive component in the coating to a minimum and, on the other hand, to optimally adjust the friction coefficients and wear and corrosion resistance. Another characteristic of the system is that it has high chemical stability against many alkalis and acids. The chemical stability can be adapted to the operating conditions by means of additional alloying elements, such as chrome.

In principle, all the attributes belonging to the thermal spraying methods can be used to produce wear resistant parts for process valves. Atmospheric plasma spraying and high-rate flame spraying (HVOF) are preferred because of their cost-effectiveness. The oxidation of the coating material during the spraying process can be avoided by alloying carbide, such as $Cr_3C_2$, with the coating powder, which carbide then oxidises during formation of metallic chrome, which in turn can be preferably alloyed with the metal binder phase.

The present invention is illustrated in greater detail by the following embodiment.

An agglomerated and sintered coating powder with a fraction size of 20 to 45 μm and the phase-like composition of (Ti, Mo)(C, N)—NiCo, made from 59.6% by mass of $TiC_{0.7}N_{0.3}$, 12.0% by mass of $Mo_2C$, 7.1% by mass of Ni and 21.3% by mass of Co, was applied with a gas mixture of propane and oxygen as a 280-μm thick coating on the front faces of test cylinders by high-rate flame spraying with a Metco DJ spraying device from a spraying distance of 180 mm, and was finished by abrading and polishing. For the sake of comparison, two test bodies were coated with conventional cemented carbide like systems (WC-17%Co and $Cr_3C_2$-25%NiCr) by the same process under conditions optimal for these systems.

The coatings were tested by a cylinder wear test, the principle of which appears from FIG. 2. The front faces of two cylindrical control bodies (25 mm×diameter 25 mm) were each coated with one and the same coating system as described above. The coated front faces of the cylinders are pressed against each other by a predetermined normal force N that exerts a predetermined pressure on the surface. One of the test cylinders is then moved back and forth by 45°. The torque, which is needed to move the test cylinders, is measured, and the friction coefficient is calculated on the basis of the torque. The test can be carried out at an elevated temperature.

The coating system of the invention exhibited a friction coefficient of 0.55 at a test temperature of 300° C. and a normal force of 10 MPa. At the same test temperature and normal force the WC-17%Co coatings exhibited a friction coefficient of 0.6. This coating system can be used only up to 450° C. and cannot be used in aqueous media. The $Cr_3C_2$-25%NiCr coatings, in turn, exhibited a friction coefficient of 0.7 at a test temperature of 300° C. already at a normal force of 8 MPa. When the pressure is higher, the coating is damaged.

What is claimed is:

1. Wear resistant process valves, the process valves comprising:
    a coating disposed on surfaces of the valves subjected to wear, the coating having a thickness within a range of 50 to 500 μm;
    wherein the coating is produced by a thermal spraying method from a coating powder having a cemented carbide microstructure including at least two cubic hard material phases and a metal binder phase, each phase having a nucleus/shell structure of a hard material particle, the nucleus of the hard material phase primarily containing Ti and C and the shell of the hard material phase primarily containing Ti, a second metal and C; and
    wherein at least one additional alloying element is simultaneously contained either in the hard material phases or in the metal binder phase or in both, whereby the nucleus/shell structure of the cubic hard material phases is transferred to the coating and can be demonstrated therein.

2. Wear resistant process valves as claimed in claim 1, wherein the coating thickness is 100 to 300 μm.

3. Wear resistant process valves as claimed in claim 1, wherein when the coatings on the valve parts are rubbed against each other at a temperature within the range of from room temperature to 600° C., a friction coefficient thereof is 0.6.

4. Wear resistant process valves as claimed in claim 3, wherein when the coatings on the valve parts are rubbed against each other at a temperature within the range of from 200° C. to 600° C., the friction coefficient thereof is less than 0.6.

5. Wear resistant process valves as claimed in claim 1, wherein the cubic hard material phase in the shell of the hard material particle comprises Mo or W as the second metal.

6. Wear resistant process valves as claimed in claim 1, wherein the additional alloying elements in the coating powder are N and/or at least one of the elements Zr, Hf, V, Nb, Ta and Cr.

7. Wear resistant process valves as claimed in claim 1, wherein the metal binder phase is also alloyed by W and/or Mo, one or more of these elements being simultaneously contained in the cubic hard material phase forming the shell of the hard material particle.

8. Wear resistant process valves as claimed in claim 1, wherein the surfaces of the valves include bearing faces and sealing faces.

* * * * *